(12) United States Patent
Scattergood

(10) Patent No.: US 9,082,060 B2
(45) Date of Patent: Jul. 14, 2015

(54) CHIP CARD INLAY FOR CONTACT-ACTIVATED AND CONTACTLESSLY ACTIVATED CHIP CARDS

(71) Applicant: SES RFID Solutions GmbH, Dusseldorf (DE)

(72) Inventor: Martin Scattergood, Dusseldorf (DE)

(73) Assignee: SES RFID SOLUTIONS GMBH, Dusseldorf (DE)

( * ) Notice: Subject to any disclaimer, the term of this patent is extended or adjusted under 35 U.S.C. 154(b) by 0 days.

(21) Appl. No.: 14/179,091

(22) Filed: Feb. 12, 2014

(65) Prior Publication Data
US 2014/0263657 A1   Sep. 18, 2014

(30) Foreign Application Priority Data
Mar. 13, 2013   (EP) .................................... 13001267

(51) Int. Cl.
*G06K 19/06* (2006.01)
*G06K 19/077* (2006.01)
*G06K 19/07* (2006.01)

(52) U.S. Cl.
CPC ...... *G06K 19/07754* (2013.01); *G06K 19/0723* (2013.01)

(58) Field of Classification Search
CPC .......... G06K 19/07749; G06K 19/027; G06K 19/0775; G06K 19/07779; G06K 19/07783; G06K 19/025; G06K 19/07718; G06K 19/07722; G06K 19/07752; G06K 19/07758; G06K 19/07769; G06K 19/07773; G06K 19/0779; G06K 19/0723; G06K 19/07754

USPC ................................................... 235/487, 492
See application file for complete search history.

(56) References Cited

U.S. PATENT DOCUMENTS

| | | |
|---|---|---|
| 7,059,535 B2 * | 6/2006 | Rietzler ....................... 235/492 |
| 2010/0018747 A1 | 1/2010 | Wang et al. |
| 2010/0133347 A9 | 1/2010 | Ayala et al. |
| 2010/0147958 A1 * | 6/2010 | Martinent et al. ............ 235/492 |
| 2012/0040128 A1 * | 2/2012 | Finn ............................... 428/96 |

(Continued)

FOREIGN PATENT DOCUMENTS

| | | |
|---|---|---|
| DE | 10 2007 001411 A1 | 1/2007 |
| JP | 2003-152017 A1 | 5/2003 |

(Continued)

OTHER PUBLICATIONS

International Preliminary Report on Patentability for EP 13 001 267.71 mailed on Jul. 30, 2013.

(Continued)

*Primary Examiner* — Seung Lee
(74) *Attorney, Agent, or Firm* — Kilpatrick Townsend and Stockton LLP

(57) ABSTRACT

Chip card inlay for contact-activated and contactlessly activated chip cards, having a planar substrate layer made of a non-conductive plastics material, on which an antenna having, at its end, planar conductive pads for attaching a chip is fastened, wherein the conductive pads are formed from a textile fabric having thread crossings, and on each top side of the textile fabric an electrically conductive contact zone is provided which has a three-dimensionally conductive terminal pad structure with weave points of the textile fabric as topographical contact zone elevations.

11 Claims, 1 Drawing Sheet

(56) References Cited

U.S. PATENT DOCUMENTS

2012/0055013 A1 3/2012 Finn
2014/0291409 A1* 10/2014 Nitta ............................ 235/492

FOREIGN PATENT DOCUMENTS

| JP | 2010-033137 A1 | 2/2010 |
| WO | WO2007104634 A1 | 9/2007 |
| WO | WO2012000910 A1 | 1/2012 |
| WO | WO2012/082300 A1 | 6/2012 |

OTHER PUBLICATIONS

English translation of the Office Action corresponding to Japanese Patent Application No. 2014-035729, issued on Jan. 27, 2015.

* cited by examiner

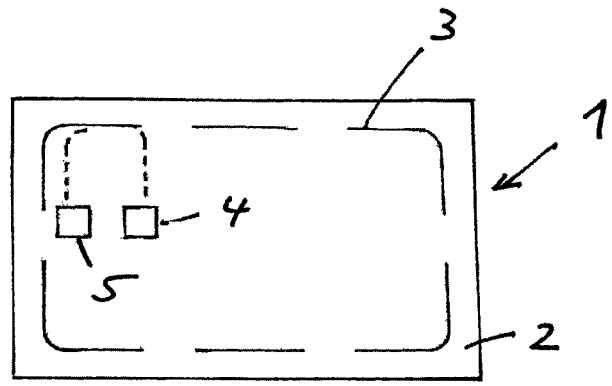
Fig. 1
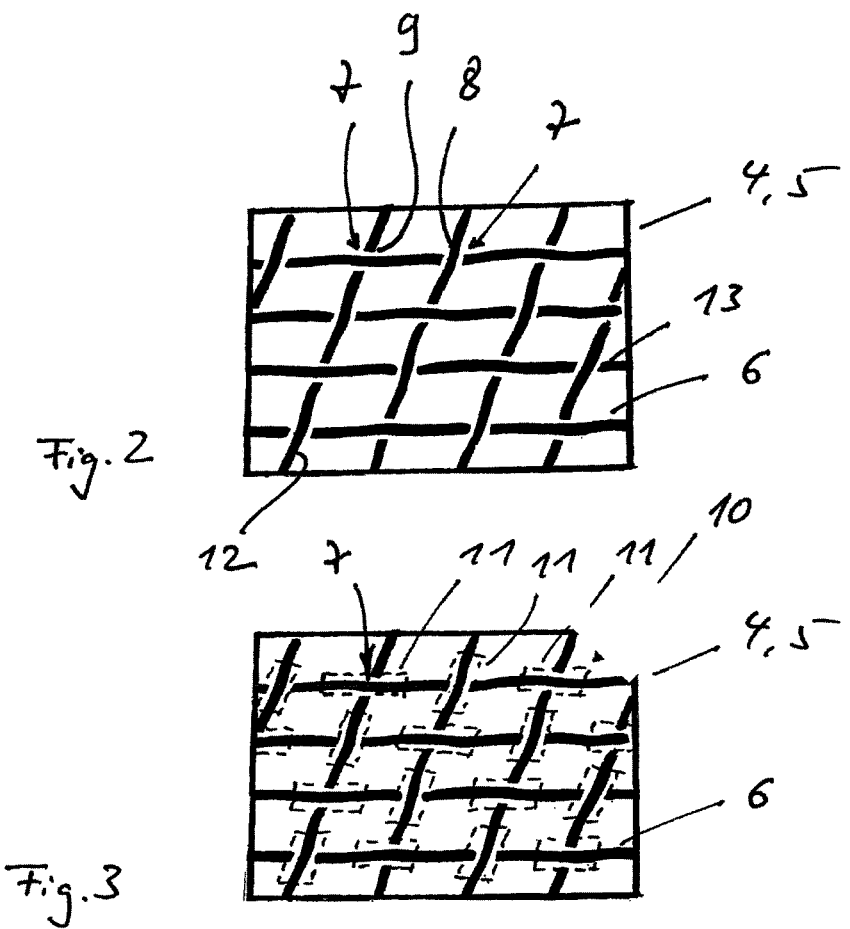
Fig. 2
Fig. 3

CHIP CARD INLAY FOR CONTACT-ACTIVATED AND CONTACTLESSLY ACTIVATED CHIP CARDS

BACKGROUND OF THE INVENTION

The invention relates to a chip card inlay for contact-activated and contactlessly activated chip cards.

Chip cards are special plastic cards having a chip which contains hardware logic, a memory or a microprocessor. Such chip cards are controlled by special card readers. Such contact chip cards are susceptible to faults on account of wear or soiling and react in a sensitive manner to vibrations which can result in brief contact interruptions. Therefore, in addition to contact chip cards, contactlessly activated chip cards, known as transponder cards, are also known, which combine two technologies for automatic identification and data acquisition. To this end, the chip used is connected to an antenna or coil in order to be contact-activatable and contactlessly activatable.

DE 10 2006 054 449 A1 discloses a transponder unit, in particular for transponder cards, identification documents or the like, in the case of which the antenna and the chip are arranged on an antenna substrate. Identification documents and charge cards, for example identity cards, passports, bank cards and credit cards, are regularly carried by people and, in addition to their intended use, are permanently stored in wallets, purses or the like. Contact activation of the transponder card is not provided.

DE 101 07 072 B4 discloses a chip card inlay which has a flat substrate made of a flexible, non-conductive material, for example PVC, on which a chip and a wire coil are fastened. The chip can be fitted on the planar surface of the substrate. However, it is also possible to insert the chip into a recess in the substrate or to embed the chip in the substrate by way of a thermocompression process. Attaching the chip to the antenna ends by way of the terminal lugs involves in this case a complicated adhesive-bonding method when the chip has an external contact face for contact activation.

BRIEF SUMMARY OF THE INVENTION

It is therefore the object of the invention to create a chip card inlay which improves the connection of the chip at the antenna ends.

This object is achieved by the features of claim 1.

As a result, a chip card inlay is created which forms a terminal panel for each end of the antenna, said terminal panel being formed by a conductive pad made of a textile fabric with thread crossings. The thread crossings are weave points of the textile fabric, at which thread raising or thread lowering takes place in order to intertwine threads. The textile fabric thus has ups, downs and irregularities, caused by the threads, which bring about an uneven surface of the textile fabric.

Via a conductive paste or a conductive film, which is applied to the textile fabric and follows the unevennesses of the surface, a three-dimensionally conductive terminal pad structure is formed. Alternatively, threads of the textile fabric may be conductive, for example on account of the use of stainless steel, silver, etc., as a result of which a three-dimensionally conductive terminal pad structure can already be formed over the textile fabric itself. A surface contour of the respective conductive pad with the weave points of the textile fabric as topographical contact zone elevations on the conductive contact zone results in a considerable improvement in the attachment of the chip to the conductive pad. The adhesion to an adhesive which connects the chip or the chip lugs thereof to the conductive pads is considerably enhanced according to the invention.

As a result, the use of a hotmelt adhesive is possible, with the result that the production of the chip cards is easier and quicker. The mechanical interlock which the cooled adhesive creates at the adhesive/conductive pad interface, produces a permanent and stable adhesive bond.

The textile fabric can have a selectable porosity independently of the textile production technique of weaving, braiding, knitting, warp knitting, to which end the thread density is settable. The thread system or thread systems of the textile production technique can in this case consist of metal fibres, glass fibres and/or synthetic fibres. The thread thicknesses are preferably in a range from 25 to 100 μm.

Further configurations and advantages of the invention can be found in the following description and the dependent claims.

BRIEF DESCRIPTION OF THE DRAWINGS

The invention is explained in more detail in the following text with reference to the exemplary embodiments illustrated in the appended drawings.

FIG. 1 schematically shows a plan view of a credit card inlay,

FIG. 2 schematically shows a plan view of a textile fabric for a conductive pad, FIG. 3 schematically shows a plan view of a conductive pad having a textile fabric as per FIG. 2 with contact zone elevations being highlighted.

DETAILED DESCRIPTION OF THE INVENTION

FIG. 1 shows a chip card inlay 1 for contact-activated and contactlessly activated chip cards, having a planar substrate layer 2 made of a non-conductive plastics material. Fastened to the substrate layer 2 is an antenna 3 having, at its end, planar conductive pads 4, 5 for attaching a chip (not illustrated). The antenna 3 is, in a known manner, preferably a planar coil.

As FIG. 2 shows, the conductive pads 4, 5 are formed from a textile fabric 6 having thread crossings 7, the weave points of which may be in the form of a raised thread 8 or lowered thread 9. As FIG. 3 shows, an electrically conductive contact zone 10 is provided on the respective face of the textile fabric 6, said electrically conductive contact zone 10 having a three-dimensionally conductive terminal pad structure with the weave points of the textile fabric as topographical contact zone elevations 11, for attaching a chip.

In order to form the conductive contact zone 10, the textile fabric 6 of the conductive pad 4, 5 can in each case be impregnated with a curable silver paste or be provided with a curable contour coating made of silver paste. Alternatively, in order to form the conductive contact zone 10, in each case a conductive film can be applied to or imprinted on the textile fabric 6 of the conductive pad 4, 5. Furthermore, alternatively or in addition, the textile fabric 6 can itself be formed in a conductive manner.

The respective textile fabric 6 can be a woven fabric, a knit, a mesh or a warp knit. If a right-angled crossing is preferred, preferably a knit is used, as FIG. 2 and FIG. 3 show. Warp threads 12 form a thread system which is crossed with weft threads 13 in for example a plain weave. The thread density of the warp threads 12 and weft threads 13 is selectable, as a result of which the porosity of the textile fabric 6 is selectable. By way of the thread density, the number of contact zone elevations 11 is also settable. The respective textile fabric 6 can in this case be formed from threads 12, 13 which cross at a distance apart.

By means of knitting, thread loops can be looped with another thread loop. Knits furthermore preferably provide a textile fabric 6 having higher porosity, depending on the selected mesh size. The respective textile fabric 6 can therefore consist of one or more thread systems.

The thread thicknesses may be in a range from 25 to 100 μm. The thread density co-determines a height of the contact zone elevation 11. The thread laying at a weave point results, with increasing thread thickness, in an enlargement of the contact zone elevation 11.

The respective textile fabric 6 can be constructed from threads 12, 13 which have a round or angular cross section. The threads 12, 13 consist preferably of metal fibres, glass fibres and/or synthetic fibres. Preferred metal fibres are those made of stainless steel. If provision is made for the textile fabric itself to be formed in a conductive manner in order, if necessary, to dispense with a silver paste, the threads 12, 13 are produced partially or entirely from conductive thread material, for example stainless steel, copper, silver or gold. Preference is further given to monofilament fibres for the threads 12, 13.

The non-conductive plastics material of the substrate layer 2 is preferably a thermoplastic, in particular PVC. The substrate layer 2 can in this case be formed in a flexible manner. At least one cover layer can be laminated onto the substrate layer 2. The cover layer can have a recess in which a chip, which is fastenable by way of hotmelt adhesives on the conductive pads 4, 5, can be inserted or embedded. The chip, thus connected electrically to the ends of the antenna 3, can then be contact-activated and contactlessly activated.

The layer structure of the chip card by means of cover layers and further inlays can be formed, depending on the field of application, using the chip card inlay 1 according to the invention.

The invention claimed is:

1. Chip card inlay for contact-activated and contactlessly activated chip cards, having a planar substrate layer made of a non-conductive plastics material, on which an antenna having, at its end, planar conductive pads for attaching a chip is fastened, wherein the conductive pads are formed from a textile fabric having thread crossings, and on each face of the textile fabric an electrically conductive contact zone is provided which has a three-dimensionally conductive terminal pad structure with weave points of the textile fabric as topographical contact zone elevations.

2. Chip card inlay according to claim 1, wherein, in order to form the conductive contact zone, the textile fabric of the conductive pad is in each case impregnated with a curable silver paste or is provided with a curable contour coating made of silver paste.

3. Chip card inlay according to claim 1, wherein, in order to form the conductive contact zone, in each case a conductive film is applied to or imprinted on the textile fabric of the conductive pad.

4. Chip card inlay according to claim 1, wherein, in order to form the conductive contact zone, the textile fabric has conductive threads.

5. Chip card inlay according to claim 1, wherein the respective textile fabric is a woven fabric, a knit, a mesh or a warp knit.

6. Chip card inlay according to claim 1, wherein the respective textile fabric consists of one or more threads systems having threads with thread thicknesses in a range from 25 to 100 μm.

7. Chip card inlay according to claim 1, wherein the respective textile fabric is constructed from threads which have a round or angular cross section.

8. Chip card inlay according to claim 7, wherein the threads consist of metal fibres, glass fibres and/or synthetic fibres.

9. Chip card inlay according to claim 1, wherein the respective textile fabric is constructed from threads which cross at a distance apart.

10. Chip card inlay according to claim 1, wherein the non-conductive plastics material of the substrate layer is a thermoplastic, in particular PVC.

11. Chip card inlay according to claim 1, wherein at least one cover layer is laminatable onto the substrate layer, and the cover layer has a chip, which is fastenable to the conductive pads by way of hotmelt adhesives, in a recess.

* * * * *